United States Patent [19]

Goldade et al.

[11] Patent Number: 5,356,699

[45] Date of Patent: Oct. 18, 1994

[54] POLYMERIC PACKAGING FILM COMPRISING AROMATIC VEGETABLE OIL

[76] Inventors: Victor A. Goldade, Kozara Str. 5, KV. 30, 246028, Gomel; Elena N. Aleshkevich, Jucilejnaya 4, KV. 99, 246032, Gomel; Sergey V. Bezrukov, Feduninskogo 6, KV. 88, 246021, Gomel; Leonid S. Pinchuk, Petchenko Str. 14, KV. 17, 246050, Gomel; Grigory V. Rechits, Ilicha 10, KV. 12, 046003, Gomel, all of U.S.S.R.; Vladimir N. Kestelman, 9201 Collins Ave., Pennsauken, N.J. 08110

[21] Appl. No.: 767,045

[22] Filed: Sep. 27, 1991

[51] Int. Cl.$^5$ .............................................. B32B 7/02
[52] U.S. Cl. ................................... 428/212; 428/218; 428/321.1; 428/497; 428/523
[58] Field of Search ............... 428/500, 521, 523, 497, 428/321.1, 310.5, 318.6, 321.2, 212, 218

[56] References Cited

U.S. PATENT DOCUMENTS

| | | | |
|---|---|---|---|
| 4,701,369 | 10/1987 | Duncan | 428/313.9 |
| 4,847,145 | 7/1989 | Matsui | 428/323 |
| 5,028,479 | 7/1991 | Pinchuk et al. | 428/310.5 |
| 5,091,262 | 2/1992 | Knott et al. | 428/516 |

Primary Examiner—Paul J. Thibodeau
Assistant Examiner—H. Thi Le
Attorney, Agent, or Firm—Simpson & Simpson

[57] ABSTRACT

Polyolefin polymeric packaging film is provided with a structure varying across its thickness from monolithic to porous with a density gradient ranging from $\rho$ to ($\frac{1}{2}$ to $\frac{1}{4}$)$\rho$, where $\rho$ is the density of monolithic polyolefin. The packaging film is characterized by a varying structure across its thickness. Such a film possesses the functions of a multi-layer film, but has none of the disadvantages of the latter associated with different adhesion of the layers, possible delamination in the course of storage and use, as well as the complex manufacturing process of a multi-layer film. The gradual transition of the porous structure of polyolefin to the poreless one from one surface of the film to another ensures distribution of liquid-phase specific additives along the film thickness.

2 Claims, No Drawings

ABSTRACT

POLYMERIC PACKAGING FILM COMPRISING AROMATIC VEGETABLE OIL

BACKGROUND OF THE INVENTION

This invention relates to packaging of food and agricultural products.

Polymeric film materials such as cellophane, polyolefins, polyamides, vinyl-series polymers, et cetera are widely used to package food and agricultural products. For better reliability and technological adaptability, the film materials are made in a multi-layer form so that the layers are joined through the use of adhesive compositions. Use is also made of previously stretched films which shrink following packaging as in the case of heat-shrinking multi-layer films. A disadvantage of such packaging is the large labor consumption during the manufacture and the expenditure of materials.

To impart spectral properties to packaging materials, they may be subjected to diffusion stabilization in softening solutions. For example, fungicides such as imidazole or triazole are introduced into one layer of the polymeric film; tile layers contacting the products in these multilayer materials, however, are typically made of modified polyolefin. These materials are expensive and poorly adapted for technological processes and, in some cases, do not prevent the contained food products from spoiling.

There is one material which has an inner layer of film comprising 70-90 parts of high density polyethylene and 30-10 parts of monomer having a fusion index 2.5-10 times as high as that of polyethylene. The disadvantage of the prior art subject matter consists in that selection of the packaging material components is significantly limited by toxicity of the monomers, and only very little of them -are allowed to contact the food products due to medical and/or sanitary criteria.

SUMMARY OF THE INVENTION

The object of this invention is to increase the storage term of food and agricultural products, to expand the functional possibilities of film packaging and to improve product quality.

To attain the object, polyolefin polymeric packaging film is provided with a structure varying across its thickness from monolithic to porous with a density gradient ranging from $\rho$ to ($\frac{1}{2}$ to $\frac{1}{4}$) $\rho$, where $\rho$ is the density of monolithic polyolefin; the porous polyolephinic frame is provided with a system of communicating pores filled with specific additives in a liquid phase.

DETAILED DESCRIPTION OF THE INVENTION

The suggested packaging film is made from a polymeric material and is characterized as a single layer having a varying structure across its thickness. Such a film possesses the functions of a multi-layer film, but has no disadvantages of the latter associated with different adhesion of the layers, possible delamination in the course of storage and use, as well as the complex manufacturing process of a multi-layer film. The gradual transition of the porous structure of polyolefin to the poreless one from one surface of the film to another ensures distribution of liquid-phase specific additives along the film thickness, which determines its operational characteristics. Such a structure of the film makes it possible to create a high concentration of the specific additive on one of its surfaces and to regulate its separation in one direction only, in particular, into the volume of the product package. As a result, the losses of the specific additive are reduced (used as specific additives in a number of cases are expensive aromatic principles and preserving substances), the storage term of the products is increased, the working conditions of the personnel participating in the packaging process are improved.

In the suggested film, the poreless surface (monolithic structure of polyolefin) carries the main mechanical load and serves as a barrier for the specific additive obstructing its separation into the outer space. The porous, softened structure can be thought of as a polymeric "jelly" comprising a porous polymeric matrix, the pores of which are filled with the plasticizing liquid whose role is played by the specific additive. In the course of operation or storage, the polymeric "jellies" spontaneously separate the plasticizing liquid from the material volume (syneresis phenomenon), which may be usefully employed for creating the required amount of the specific additive on the package inner surface of the required concentration of its vapors within the hermetically-sealed volume.

The polymeric packaging film is obtained by way of extruding melted thermoplastic material in a vertical, upward direction through a slit-type extrusion head with its subsequent distending into a tubing. Concurrently with distending the tubing, there is effected contacting of one (external or internal) surface or both surfaces of the film with the plasticizer (specific additive). The essence of the process that ensures formation of the porous structure of the thermoplastic material in the film consists in the following. When leaving the extrusion head, the melted thermoplastic material being in viscous-liquid state contacts plasticizer, which results in formation of a colloid-type solution with the softener gradient distributed over the film thickness. Then the tubing is cooled, the colloid solution is disintegrated into phases with the formation of porous structure whose pores are filled with-the plasticizer. The conditions of contacting of the polyolefin melt with the liquid-phase additive are selected so that the apparent density of polyolefin in the surface that has been contact with the liquid is $\frac{1}{2}$ to $\frac{1}{4}$ of the density of monolithic polyolefin. Formed in such a manner, film has a non-uniform structure across its thickness.

The suggested polymeric packaging film is intended mainly for packaging fresh and preserved vegetables, fats and oils, fish and meat products. The films having a thickness of 30 to 200 $\mu$ have been manufactured using the pneumoextrusion method on the tubing-film aggregate.

According to the invention, the film contains as a specific additive the following ingredients: vegetable aromatic principles selected from the group including the oils of fennel, laurel, onion, lovage root, tarragon, caraway, thyme, marjoram, mustard, lemon and pinks or the solution of aromatic principles in a plasticizer. To protect fresh fruits and vegetables and some other food products, there is suggested the film which contains as a specific additive the sodium salts of aldahyde-bisulofite addition products.

To manufacture the films, use has been made of the following materials:

(a) as a polyolefin:

low-density polyethylene (900–939 kg./m³) having a melting temperature of 105° to 108° C. and specific elongation of 400 to 600%;

high-density polyethylene (948–959 kg./m³) having a melting temperature of 125° to 135° C. and specific elongation of 300 to 800%;

the vitality of fungus in the test dishes, the samples were extracted from the cabinet so as to reveal the growth of fungus; visual inspection was performed with naked eyes and then with a microscope having a magnification of 60 power. The evaluation of immunity from the mold fungus was performed according to a six-point scale.

TABLE 1

Compositions of Packaging Films

Contents of components (mass percentage) in compounds Nos.:

| Components | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| HDPE* | 99.8 | 99.5 | 89.5 | 97 | 90 | 95 | 92 | 93 | 97 | 97 | 97 | 90 | 97 | 87 | 89.5 | 90 | 97 | 89.5 | 97 | 97 | 80 |
| Oils of: | | | | | | | | | | | | | | | | | | | | | |
| Fennel | — | — | — | — | — | — | — | — | 3 | — | — | — | — | — | — | — | — | — | — | — | — |
| Laurel | 0.2 | 0.5 | 0.5 | 3 | 3 | 5 | 5 | 7 | — | 3 | — | — | — | — | — | — | — | — | — | — | — |
| Onion | — | — | — | — | — | — | — | — | — | — | 3 | 3 | — | — | — | — | — | — | — | — | — |
| Lovage root | — | — | — | — | — | — | — | — | — | — | — | — | 3 | 3 | — | — | — | — | — | — | — |
| Tarragon | — | — | — | — | — | — | — | — | — | — | — | — | — | — | 0.5 | — | — | — | — | — | — |
| Caraway | — | — | — | — | — | — | — | — | — | — | — | — | — | — | — | 3 | — | — | — | — | — |
| Thyme | — | — | — | — | — | — | — | — | — | — | — | — | — | — | — | — | 3 | 0.5 | — | — | — |
| Marjoram | — | — | — | — | — | — | — | — | — | — | — | — | — | — | — | — | — | — | 3 | — | — |
| Mustard | — | — | — | — | — | — | — | — | — | — | — | — | — | — | — | — | — | — | — | 3 | — |
| Vacuum oil BM-1 | — | — | 10 | — | 7 | — | 3 | — | — | — | — | 7 | — | 10 | 10 | 7 | — | 10 | — | — | — |
| Dimethyl-octane | — | — | — | — | — | — | — | — | — | — | — | — | — | — | — | — | — | — | — | — | 20 |

*High density polyethylene (b) as vegetable aromatic principles—the oils of fennel, laurel, onion, lovage root, tarragon as well as the oils of caraway, thyme, marjoram, mustard, lemon and pinks;

(c) as a softener (plasticizer)—vacuum oil BM-1 (density of 887 kg./m³, viscosity of $(65–69).10^{-6} m^2/s$ at 50° C., flash point in the open crucible being 235° to 248° C.).

In a number of cases, the softener, which may be any of the plasticizers known in the art, is used as a liquid-carrier which dissolves the vegetable aromatic principles. The necessity of its use is stipulated by expensiveness and deficiency of aromatic principles. To achieve a positive effect, there is no need to have a large concentration of aromatic principles (not more than 5 of the mass percentage), whereas to create porosity in the film surface, such amount of the plasticizing liquid may happen to be insufficient. Therefore, an additional amount of the plasticizing liquid is introduced.

A piece of boiled meat (pork) inoculated with bacteria was packed into film using a method of hermetical sealing. Evaluation of the film of the present invention was made using a standard method of tests for immunity from mold fungus effects. Specified below is the test procedure and mycological information which prove the immunity of the suggested film and the products packed into this film from the mold fungus micro flora.

The samples of boiled meat were inoculated with a pure culture of mold fungus, class Ascomycets, family Aspergillaceae, genus Aspergillus, type Penicillium, in a form of aqueous suspended matter of spores, with the help of a pulverizer. Then, the samples were dried in a constant-temperature cabinet at a temperature of 25° C. and a relative humidity of up to 80% for a period of 30 min.; thereafter, the samples were packed and hermetically sealed into the films (whose compositions are specified in Table 1), and kept in a constant-temperature cabinet at a temperature of 29° C. and relative humidity of up to 90%. Simultaneously, placed into the constant-temperature cabinet were Petri dishes containing potato-dextrose habitat with sown cultures of fungus subject to examination. Three days after, upon making sure of The second state of the tests was as follows. On the inner side of packages that has been in contact with the samples, there were taken the washed-off samples of the matter which were then placed in the dishes, and the fungus spores were sown there. After the dishes have been kept for three days in the constant-temperature cabinet at a temperature of 29° C. and a relative humidity of more than 90%, the washed-off samples of the matter were evaluated for immunity from the mold fungus according to the six-point scale. The test results specified in Table 2 are indicative of the fact that the suggested films (compounds 2–20) possess a considerably higher immunity from the mold fungus microflora as compared with the prior art films (compound 21).

TABLE 2

Immunity of Films From Mold Fungus

| Nos of film compounds (according to Table 1) | Evaluation of immunity from mold fungus, points | |
|---|---|---|
| | Of samples of meat | Of samples of the matter washed off the film |
| 1 | 5 | 4 |
| 2 | 2 | 1 |
| 3 | 1 | 0 |
| 4 | 1 | 0 |
| 5 | 1 | 0 |
| 6 | 1 | 1 |
| 7 | 0 | 0 |
| 8 | 1 | 0 |
| 9 | 1 | 0 |
| 10 | 0 | 0 |
| 11 | 1 | 0 |
| 12 | 1 | 1 |
| 13 | 1 | 0 |
| 14 | 0 | 0 |
| 15 | 2 | 1 |
| 16 | 2 | 1 |
| 17 | 1 | 1 |
| 18 | 1 | 0 |
| 19 | 1 | 1 |
| 20 | 1 | 0 |
| 21 | 5 | 5 |

There were also conducted additional tests of the suggested packaging films so as to compare them with the prior art combination packaging material, using fresh cooled meat (beef). For the purpose, use was made of the films (compound 3, Table 1) having a thickness of 30 μ and 100 μ, as well as packaging foliated material CRO-NEL, Crowell corporation (USA patent No. 4086384). Samples of meat cooled to −30° C. were inoculated with the aqueous suspended matter of mold fungus, packed into the films under test and kept in the constant-temperature cabinet at a temperature of 29° C. and a relative humidity of more than 90%. For the purpose, use was made of the following -four classes of pure cultures of mold fungus:

1—*Aspergillus penicilloides* Speg;
2—*Aspergillus terreus* Thom;
3—*Penicillium chrysogenum* Thom;
4—*Paecilomyces varioti* Bainier.

The data given in Table 3 point to the fact that the suggested film imparts the meat the greater immunity from the mold fungus microflora.

TABLE 3

Immunity of Film Samples From Various Classes of Mold Fungus, Points

| Number of days | Classes of mold fungus | Suggested film 30 mm. | Suggested film 100 mm. | CRO-NEL |
|---|---|---|---|---|
| 1 | 1 | 0 | 0 | 1 |
|   | 2 | 0 | 0 | 1 |
|   | 3 | 0 | 0 | 1 |
|   | 4 | 0 | 0 | 1 |
| 2 | 1 | 0 | 0 | 5 |
|   | 2 | 0 | 0 | 5 |
|   | 3 | 0 | 0 | 5 |
|   | 4 | 0 | 0 | 5 |
| 3 | 1 | 1 | 0 | 6 |
|   | 2 | 1 | 1 | 6 |
|   | 3 | 1 | 1 | 6 |
|   | 4 | 1 | 0 | 6 |
| 4 | 1 | 1 | 0 |   |
|   | 2 | 2 | 1 |   |
|   | 3 | 2 | 2 |   |
|   | 4 | 1 | 1 |   |
| 5 | 1 | 1 | 1 |   |
|   | 2 | 3 | 2 |   |
|   | 3 | 3 | 3 |   |
|   | 4 | 2 | 2 |   |

The film resistance to oxidation was evaluated as to the value of acid number. For the purpose, use was made of the method based on neutralizing the free acids with the alkali alcohol solution. The weighed portions of the film of different compounds, having a mass of 50 mg., were dissolved in 20–30 mg. of toluene with addition of 3–4 drops of phenolphthalein into the solution, and the solutions were titrated with the 0.1 normal alcohol solution of potassium hydroxide till appearance of pink color. The test experiment was performed under similar conditions. The acid number (mg. KOH/g.) was calculated by the formula:

$$x = \frac{(V_2 - V_1) \cdot 0.0056}{m} \cdot 1000, \text{ where}$$

0.0056 is the amount of KOH (potassium hydroxide) contained in 1 ml. of the 0.1 normal solution of KOH; $V_1$ and $V_2$ are the volumes of the 0.1 normal solution of KOH consumed for titrating the test and examined solutions, ml.; and m stands for the weighed portion of the film.

The test results are tabulated below.

| No.s of Compounds According to Table 1 | 1 | 4 | 9 | 10 | 11 | 13 | 15 | 16 | 17 | 19 | 20 | 21 |
|---|---|---|---|---|---|---|---|---|---|---|---|---|
| Acid number | 2.34 | 3.12 | 3.97 | 3.21 | 3.35 | 2.79 | 3.48 | 2.85 | 2.76 | 3.41 | 3.24 | 3.14 |

The analysis of the obtained data shows the high resistance of the suggested film to oxidation, since the values of acid number do not exceed the analogous values of the polymers which are allowed to contact the food products, e.g. polyvinylchloride and polyacrylates ($x \leq 10$), polystyrene ($x \leq 5$), etc.

The polymeric packaging film containing the sodium salts of aldahyde-bisulfite addition products was manufactured using the pneumoextrusion method on the tubing-film aggregate; the aldahyde-bisulfite addition products were obtained as a result of reaction of aldehydes applied to the inner surface of the tubing in the course of extrusion with the sodium bisulfite being mixed with the polyolefin before the extrusion. Used as aldehydes were acetaldehyde and propionic aldehyde as well as sorbic acid aidehyde.

The aldehyde solution in the plasticizer was placed above the extrusion head core and immediately after it left the slit-type head, it was brought into contact with the inner surface of the polymeric tubing. The air supplied inside the tubing was enriched by ozone to oxidize the aldehydes which failed to react into the respective carboxylic acids. The compositions of the obtained films are specified in Table 4. The films were tested during the storage of apples "Delicious" and cucumbers "Duncan."

TABLE 4

Compositions of Packaging Films

| Components | Contents of components, mass percentage, in compounds Nos: | | | | | | | |
|---|---|---|---|---|---|---|---|---|
| High density Polyethylene | 22 | 23 | 24 | 25 | 26 | 27 | 28 | 29 |
| Acetaldehyde-bisulfite addition prod. | 94.63 | 94.35 | 93.9 | 93.35 | 90.0 | 90.82 | 93.08 | 99.7 |
| Propionic aldehyde-bisulfite add. prod. | 0.3 | — | — | — | 7.0 | — | 3.0 | — |
| Sorbic aldehyde-bisulfite add. prod. | — | — | 3.0 | — | — | — | — | — |
| Acetic acid | — | 0.5 | — | 5.0 | — | 3.0 | — | — |
| Propionic acid | 0.02 | — | — | — | 0.5 | — | 0.12 | — |
| Sorbic acid | — | — | 0.1 | — | — | — | — | — |
| Sodium bisulfite | — | 0.5 | — | 0.15 | — | 0.08 | — | — |
| Vacuum oil | 0.05 | 0.1 | 1.0 | 1.5 | 2.5 | 1.1 | 0.8 | — |
| 1-[2-(2,4-dichlorophenium)-2-(2-propenylhydro)-ethyl] | — | — | — | — | — | — | — | 0.3 |

TABLE 4-continued

| Compositions of Packaging Films | | | | | | | | |
|---|---|---|---|---|---|---|---|---|
| Components | Contents of components, mass percentage, in compounds Nos: | | | | | | | |
| | 22 | 23 | 24 | 25 | 26 | 27 | 28 | 29 |
| High density Polyethylene | | | | | | | | |
| IH-imidazol | | | | | | | | |

Given in Table 5 are the data specifying the time during which the packaged products retained the quality acceptable for use. During the storage term, subject to check was the mass of fruits and vegetables, and these data are also reflected in Table 5.

TABLE 5

| | Storage Time and Loss of Mass of the Fruits and Vegetables Packed into Films | | | | | | | |
|---|---|---|---|---|---|---|---|---|
| Compound No. | Apples | | | | Cucumbers | | | |
| according to | Storage time, | Loss of mass, %, within | | | Storage time, | Loss of mass, %, within | | |
| Table 4 | days | 28 day | 35 days | 42 days | days | 3 days | 5 days | 7 days |
| 22 | 8 | — | — | — | 3 | 8.1 | — | — |
| 23 | 29 | 0.1 | — | — | 8 | 3.2 | 5.7 | 7.2 |
| 24 | 32 | 5.5 | — | — | 9 | 3.6 | 4.9 | 6.1 |
| 25 | 43 | 1.8 | 2.4 | 3.0 | 1 | 2.1 | 3.4 | 4.6 |
| 26 | 20 | — | — | — | 4 | 5.3 | — | — |
| 27 | 49 | 2.1 | 2.8 | 3.4 | 14 | 2.7 | 3.8 | 5.2 |
| 28 | 34 | 3.3 | — | — | 7 | 3.2 | 5.0 | 7.3 |
| 29 | 13 | — | — | — | 5 | 6.6 | 9.3 | — |

The obtained results are indicative of a high efficiency of the suggested packaging film. So, the apples packed into film No. 25 retain their suitable-for-use properties within 43 days at a room temperature and loose only about 3% of their mass.

Thus, as far as the storage term and technological-process adaptability are concerned, the suggested packaging films are superior to the prior art films and can be used for packaging the food and agricultural products.

What is claimed is:

1. A polyolefin packaging, unitary film characterized by extended functional capabilities, and improved qualify and operational characteristics having a film structure varying across its thickness from monolithic to porous, with a density gradient ranging from $\rho$ at the monolithic surface to ($\frac{1}{2}$ to $\frac{1}{4}$)$\rho$ at the porous surface, where $\rho$ is the density of monolithic polyolefin, the pores of the polyolefinic film communicating with said porous surface and filled with liquid additives, and further characterized in that to increase the storage term of food products and simplify packaging technology, the pores of the film contain as a specific oil additive of at least one aromatic vegetable selected from the group consisting of fennel, laurel, onion, lovage root, tarragon, caraway, thyme, marjoram, mustard, lemon and pinks, alone or in solutions in a plasticizer, said film comprising, in mass percentage:

| Polyolefin | 85–99.5 |
|---|---|
| aromatic vegetables | 0.5–5 |
| Plasticizer | 0–10. |

2. A polyolefin packaging, unitary film characterized by extended functional capabilities, and improved quality and operational characteristics having a film structure varying across its thickness from monolithic to porous, with a density gradient ranging from $\rho$ at the monolithic surface to ($\frac{1}{2}$ to $\frac{1}{4}$)$\rho$ at the porous surface, where $\rho$ is the density of monolithic polyolefin, the pores of the polyolefinic film communicating with said porous surface and filled with liquid additives, and further characterized in that to increase the storage term of fruits, vegetables and other agricultural products, the liquid additives in said pores of the film contain as a specific additive a sodium salt of an aldehyde-bisulfite addition product in which the aidehyde contains from 2 to 6 carbon atoms, said liquid additive comprising the following composition, in mass percentage:

| Polyolefin | 88.35–99.35 |
|---|---|
| Sodium salt of aldehyde-bisulfite addition product | 0.05–5.00 |
| Sodium bisulfite | 0.10–1.50 |
| Carboxylic acids | 0.05–0.15 |
| Plasticizer | 0–5 |

* * * * *